United States Patent [19]

Concina

[11] Patent Number: 4,464,949

[45] Date of Patent: Aug. 14, 1984

[54] TOOTHED PULLEY OF PRESSED SHEET METAL

[75] Inventor: Giuseppe Concina, Cirie', Italy

[73] Assignee: Algat S.p.A., San Carlo Canavese, Italy

[21] Appl. No.: 366,512

[22] Filed: Apr. 8, 1982

[30] Foreign Application Priority Data

Apr. 17, 1981 [IT] Italy .............................. 53159/81[U]

[51] Int. Cl.³ ...................... F16H 55/12; F16H 55/30
[52] U.S. Cl. ........................................ 74/449; 74/439; 474/152
[58] Field of Search ................. 74/449, 439; 474/152, 474/165, 183, 182, 181; 403/274, 277; 264/249; 29/159.3, 159.2

[56] References Cited

U.S. PATENT DOCUMENTS

| | | | |
|---|---|---|---|
| 516,398 | 3/1894 | Moore | 474/183 |
| 666,403 | 1/1901 | Wood | 403/277 |
| 1,388,657 | 8/1921 | MacDonald et al. | 403/277 |
| 1,606,175 | 11/1926 | Olinger | 474/183 |
| 2,162,902 | 6/1939 | Adams | 474/183 |
| 2,610,514 | 9/1952 | Long, Jr. | 474/183 |
| 2,640,618 | 6/1953 | Hale, Jr. | 403/277 |
| 2,724,975 | 11/1955 | Drummond | 74/449 |
| 2,729,110 | 1/1956 | Killian et al. | 74/449 |
| 2,922,310 | 1/1960 | Anderson | 474/183 |
| 2,923,166 | 2/1960 | Brindley et al. | 74/449 |
| 3,050,160 | 8/1962 | Chesser | 403/274 |
| 3,193,921 | 7/1965 | Kahn | 403/277 |
| 3,565,490 | 2/1971 | Statz | 474/183 |
| 3,592,511 | 7/1971 | Hudelson | 474/183 |
| 4,231,265 | 11/1980 | Hamisch et al. | 474/152 |
| 4,233,726 | 11/1980 | Williams | 403/274 |

FOREIGN PATENT DOCUMENTS 672214  5/1952  United Kingdom ................. 74/449

Primary Examiner—Lawrence J. Staab
Assistant Examiner—M. David Bednarek
Attorney, Agent, or Firm—Sughrue, Mion, Zinn, Macpeak & Seas

[57] ABSTRACT

A toothed pulley of pressed sheet metal comprising a first sheet metal element which includes a cylindrical toothed rim connected to a centrally-apertured internal disc lying in a plane perpendicular to the axis of the toothed rim and substantially equidistant from the two circumferential end edges of the toothed rim, a second sheet metal element including a centrally-apertured, internal, flat disc which mates with and is fixed to the internal disc of the first sheet metal element, and is connected to an outer circumferential flange projecting radially from and fixed to one of the end circumferential edges of the toothed rim, and a sheet metal hub which includes a central cup-shaped portion inserted in the coinciding central apertures of the internal discs of the sheet metal elements and has a centrally-apertured, flat, bottom surface for contact with an end surface of the support shaft for the pulley, and a flat, outer circumferential flange fixed to the two discs.

1 Claim, 8 Drawing Figures

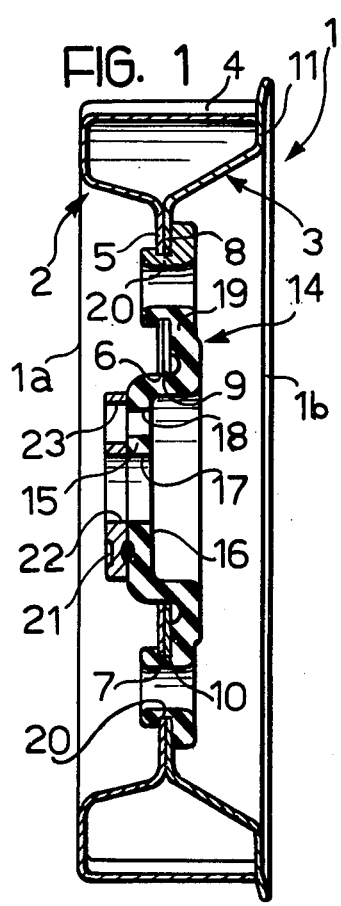
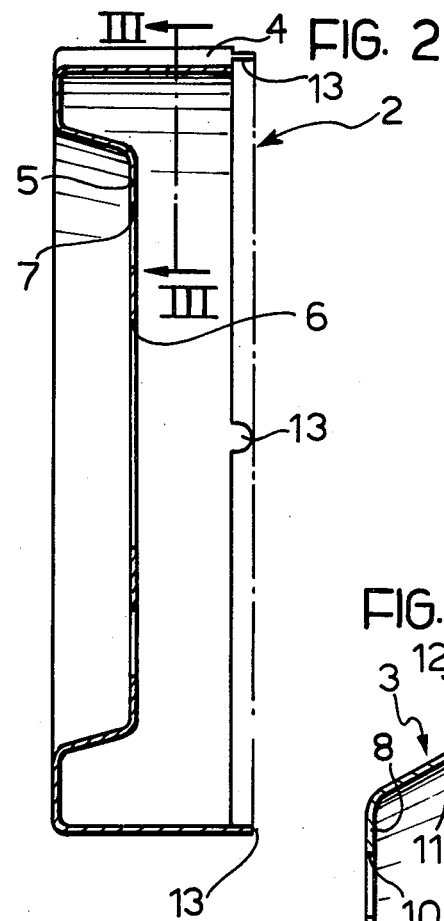
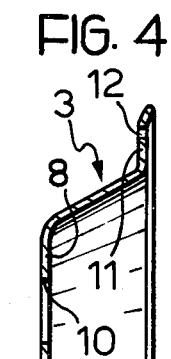
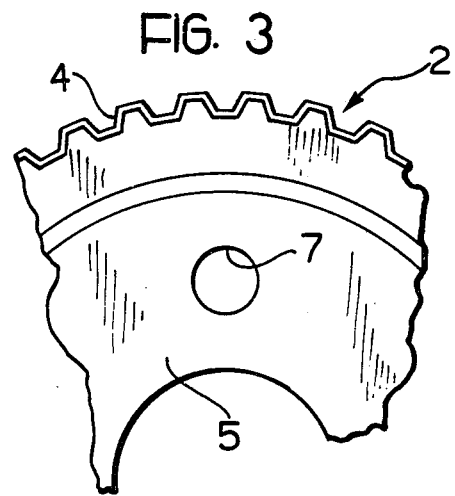
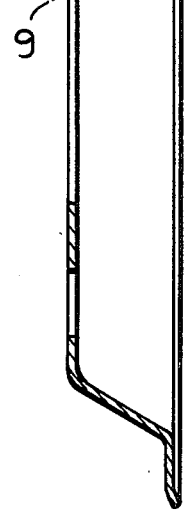

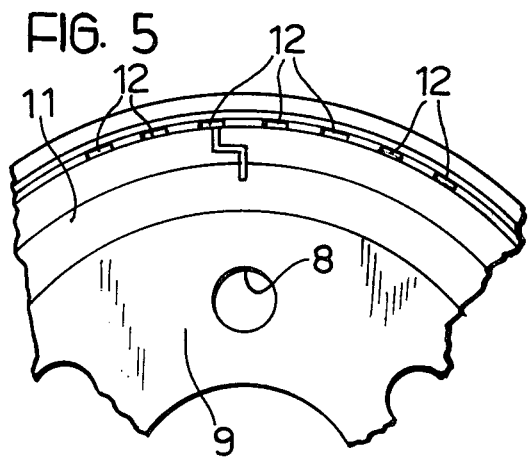
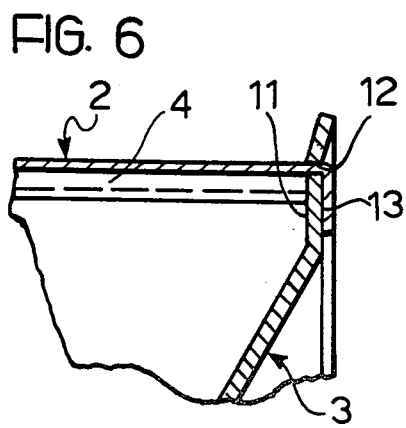
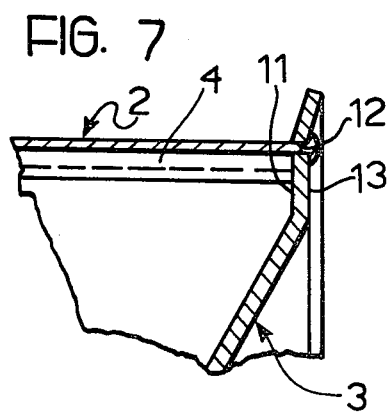
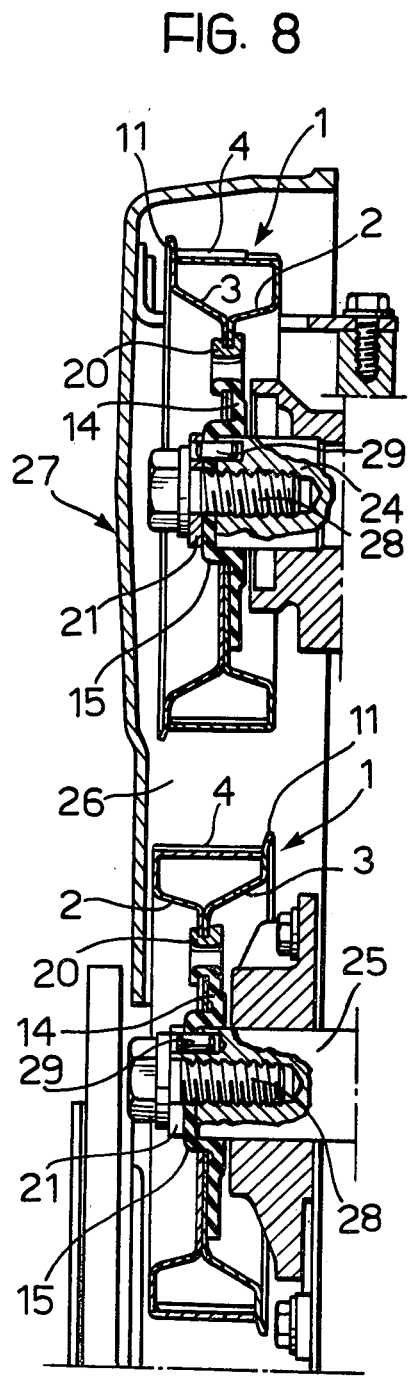

TOOTHED PULLEY OF PRESSED SHEET METAL

The present invention relates to toothed pulleys of pressed sheet metal, of the type usuable in a toothed belt drive for driving the camshaft of an internal combustion engine.

The object of the present invention is to provide a toothed pulley of the type mentioned above which allows the manufacture and assembly of the belt drive for driving the camshaft to be rendered simpler and more economical.

The main characteristic of the toothed pulley according to the invention lies in the fact that it comprises, in combination:

a first sheet metal element which includes a cylindrical toothed rim connected to a centrally-apertured internal disc lying in a plane perpendicular to the axis of the toothed rim and substantially equi-distant from the two circumferential end edges of the toothed rim;

a second sheet metal element including a centrally-apertured, internal, flat disc which mates with and is joined to the internal disc of the first sheet metal element, and is connected to an outer circumferential flange projecting radially from and fixed to one of the circumferential end edges of the toothed rim, and a sheet metal hub which includes a central cup-shaped portion inserted in the coinciding central apertures of the internal discs of the two sheet metal elements, and has a centrally apertured, flat, bottom surface for contact with an end surface of the support shaft for the pulley, and a flat, outer, circumferential flange fixed to the two discs.

Further characteristics and advantages of the present invention will emerge from the description which follows with reference to the appended drawings provided purely by way of non-limiting example, in which:

FIG. 1 is a sectional view of a toothed pulley according to the present invention;

FIG. 2 is a sectional view of a detail of FIG. 1;

FIG. 3 is a section taken on the line III—III of FIG. 2;

FIG. 4 is a sectional view of a further detail of FIG. 1;

FIG. 5 is a partial front view of the detail of FIG. 4;

FIGS. 6 and 7 illustrate a detail of FIG. 1, and

FIG. 8 is a sectional view of a belt drive using a series of pulleys according to the present invention.

FIG. 1 illustrates a toothed pulley of pressed sheet metal, generally indicated 1, comprising a first sheet metal element 2 and a second sheet metal element 3.

The first sheet metal element 2 (also illustrated in FIG. 2) comprises a cylindrical toothed rim 4 (see FIG. 3) which is connected to an internal disc 5 having a central aperture 6 and a ring of smaller diameter holes 7 (see FIGS. 2 and 3). The internal disc 5 lies in a plane substantially equi-distant from the circumferential end edges 1a, 1b of the pulley 1.

The second sheet metal element 3 includes a flat internal disc 8 which is fixed in a position of mating with the disc 5 of the element 2. The internal disc 8 of the sheet metal element 3 has a central aperture 9, with a diameter corresponding to that of the aperture 6, and a series of holes 10 corresponding in position and diameter to the holes 7 (see FIG. 4). The internal disc 8 of the sheet metal element 3 is connected to a flat, outer circumferential flange 11 which projects radially from the circumferental edge 1b of the toothed rim 4 and is fixed to this edge 1b. As illustrated in FIG. 5, the flange 11 has a circumferential series of apertures 12 adjacent its peripheral edge. The sheet metal element 2 is provided with equi-angularly spaced axial tabs 13 adjacent its circumferential end edge 1b, which are inserted in corresponding apertures 12 in the flange 11.

As illustrated in FIG. 6, the tabs 13 are bent and welded electrically to the flange 11, after their insertion in the apertures 12. FIG. 7 illustrates an alternative method in which the tabs 13 are upset electrically, once introduced into the apertures 12, so as to form a head 13b which prevents their withdrawal.

The portion of the flange 11 which projects radially outwardly from the toothed rim 4 is intended to retain the toothed belt laterally so as to stop it coming off the pulley.

The pulley according to the present invention has a hub 14 (see FIG. 1) constituted by sheet metal element comprising a central, cup-shaped portion 15 which is inserted in the coinciding apertures 6, 9 of the two discs 5, 8. The cup-shaped portion 15 has a flat bottom surface 16 for contact with the end surface of a support shaft for the pulley (see FIG. 8). The cup-shaped portion 15 further includes a central aperture 17 for a screw for fixing the pulley to the support shaft, and an eccentric hole 18 for a locating peg which enables the correct angular positioning of the pulley on the support shaft (see FIG. 8). The central cup-shaped portion 15 is joined to a flat, outer circumferential flange 19 which is connected to the discs 5, 8 of the two sheet metal elements 2, 3. The outer flange 19 of the hub 14 has a circumferential series of tubular axial projections 20 which are inserted in the coinciding holes 6, 9 of the discs 5, 8, each having its free end edge bent outwardly by plastic deformation in order to fasten the elements together.

To the central cup-shaped portion 15 of the hub 14, on the side opposite the surface 16, is welded a washer 21 with a central aperture 22 of the same diameter as the aperture 17, and an eccentric hole 23 coaxial with the hole 18.

FIG. 8 illustrates a toothed belt drive using the toothed pulley according to the present invention. Reference numeral 24 indicates the camshaft of an internal combustion engine, which is supported for rotation by the engine block by means of bearings (not illustrated), while reference numeral 25 indicates an auxiliary shaft rotated by means of the drive.

Three toothed pulleys are mounted on the camshaft 24, the auxiliary shaft 25, and the engine shaft (not illustrated), which are connected together for rotation by means of a toothed belt 26.

The casing for the drive system is indicated 27.

Each pulley 1 is fixed to the corresponding shaft by a fixing screw 28 which is engaged in the holes 22, 17 in the washer 21 and the central portion 15 of the hub 14. A locating peg 29 is inserted in the holes 23, 18 of the washer 21 and the hub 14 for the correct angular orientation of the pulley on the support shaft.

The two pulleys illustrated in FIG. 8 have their flanges 11 disposed on opposite sides of the belt 26 so as to stop it coming off.

The two pulleys illustrated have identical structures and configurations, with the exception of the position of assembly of the two sheet metal elements 2, 3 relative to the hub 14.

Indeed, in one case the hub 14 is in direct contact with the sheet metal element 3, while in the other case it is in direct contact with the sheet metal element 2.

The particular above-described configuration of the pulley according to the present invention allows, in fact, the two sheet metal elements 2, 3 to be mounted equally well on the hub 14 facing one way or the other, without the toothed rim 4 undergoing any substantial axial displacement relative to the support shaft.

By virtue of this characteristic, therefore, the fabrication and assembly of the drive system is particularly simple and economical.

Naturally, the present invention also extends to other models which achieve equal utility by using the same inventive concept.

What is claimed is:

1. A toothed pulley of pressed sheet metal comprising:

a first sheet metal element including a cylindrical toothed rim having two circumferential end edges, an internal disc having a central aperture and at least one radially outwardly located hole connected to one of said edges and located in a plane perpendicular to the axis of said cylindrical rim substantially equi-distantly from said circumferential end edges and a plurality of axially directed tabs extending from the other end of said rim;

a second sheet metal element including an internal flat disc having a central aperture and at least one radially outwardly located hole mating with the central aperture and each hole in the disc of said first element and an axially offset circumferential flange having a plurality of apertures extending radially outwardly beyond said rim with said tabs extending through said apertures and being bent to connect said first and second elements together; and a sheet metal hub including a central cup-shaped portion inserted in said mating central apertures of said disc with a centrally apertured flat, bottom surface for contact with an end surface of a pulley support shaft and a flat radially outwardly directed circumferential flange having a number of tubular axial projections corresponding to the number of holes in the said disc and extending through each hole with the ends of each projection being bent to secure said hub to said disc.

* * * * *